United States Patent
Lee et al.

(10) Patent No.: US 9,223,437 B2
(45) Date of Patent: Dec. 29, 2015

(54) METHOD, TOUCH SENSING APPARATUS AND COMPUTER-READABLE RECORDING MEDIUM FOR MINIMIZING NOISE ON TOUCH PANEL

(71) Applicant: HiDeep Inc, Seongnam-si, Gyeonggi-do (KR)

(72) Inventors: Hwanhee Lee, Yuseong-gu (KR); Sangsic Yoon, Gyeonggi-do (KR)

(73) Assignee: HiDeep Inc., Seongnam (KR)

( * ) Notice: Subject to any disclaimer, the term of this patent is extended or adjusted under 35 U.S.C. 154(b) by 206 days.

(21) Appl. No.: 13/797,202

(22) Filed: Mar. 12, 2013

(65) Prior Publication Data
US 2013/0257765 A1    Oct. 3, 2013

(30) Foreign Application Priority Data

Mar. 28, 2012 (KR) .................. 10-2012-0031638

(51) Int. Cl.
*G06F 3/041* (2006.01)
*G06F 3/044* (2006.01)

(52) U.S. Cl.
CPC ............. *G06F 3/0418* (2013.01); *G06F 3/041* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 5,565,658 A | 10/1996 | Gerpheide et al. | |
| 7,031,886 B1 * | 4/2006 | Hargreaves | G06F 3/044 375/350 |
| 7,643,011 B2 * | 1/2010 | O'Connor et al. | 345/173 |
| 8,120,591 B2 * | 2/2012 | Krah | G06F 3/0412 345/173 |
| 8,294,687 B1 * | 10/2012 | Ksondzyk | G06F 3/0418 178/18.01 |
| 8,816,984 B2 * | 8/2014 | Hotelling et al. | 345/173 |
| 8,874,396 B1 * | 10/2014 | Olson | G06F 3/044 345/173 |
| 8,970,547 B2 * | 3/2015 | Sabo | G06F 3/044 345/173 |
| 2008/0157893 A1 * | 7/2008 | Krah | G06F 3/0418 331/177 R |
| 2011/0090160 A1 * | 4/2011 | Chen | G06F 3/0412 345/173 |
| 2012/0105353 A1 * | 5/2012 | Brosnan | G06F 3/044 345/174 |
| 2012/0217978 A1 * | 8/2012 | Shen et al. | G06F 3/0418 324/601 |
| 2012/0268415 A1 * | 10/2012 | Konovalov | G06F 3/044 345/174 |
| 2013/0069894 A1 * | 3/2013 | Chen et al. | 345/173 |
| 2013/0127773 A1 * | 5/2013 | Kwon et al. | 345/174 |
| 2013/0176272 A1 * | 7/2013 | Cattivelli et al. | 345/174 |
| 2013/0293511 A1 * | 11/2013 | Nam | G06F 3/0418 345/174 |

FOREIGN PATENT DOCUMENTS

JP    11-505641    5/1999

OTHER PUBLICATIONS

Japanese Office Action issued Feb. 4, 2014; 2 pages.

* cited by examiner

*Primary Examiner* — Dismery Mercedes
(74) *Attorney, Agent, or Firm* — Foley & Lardner LLP (57) ABSTRACT

Disclosed is a method for minimizing noise on a touch panel including a plurality of drive lines and a plurality of sensing lines, wherein the drive lines and the sensing lines cross each other, the method including: performing a dummy scan to sense a signal from the sensing line in a state where a driving signal is not applied to the drive line; and comparing a threshold with a magnitude of a signal obtained through the dummy scan, and estimating noise in a first frequency band, i.e., a frequency of the driving signal.

6 Claims, 5 Drawing Sheets

METHOD, TOUCH SENSING APPARATUS AND COMPUTER-READABLE RECORDING MEDIUM FOR MINIMIZING NOISE ON TOUCH PANEL

CROSS-REFERENCE TO RELATED APPLICATION

The present application claims priority under 35 U.S.C. §119(e) of Korean Patent Application No. 10-2012-0031638 filed Mar. 28, 2012 the subject matters of which are incorporated herein by reference.

BACKGROUND

1. Field

The present invention relates to a method, a touch sensing apparatus and a computer-readable recording medium for minimizing noise on a touch panel.

2. Background

In general, with the development of electronic communication technology, a variety of electronic devices are being provided. The electronic devices have a tendency to have manipulation easiness and a good design. In accordance with the trend, it is emphasized that an input device including a representative keyboard or keypad should be diversified.

The input device has been developed from a data processing by using the input device such as the keyboard or keypad to a touch panel functioning as both an input device and an output device. The touch panel has a concept which commonly designates an input device allowing a user to input data by using no separate input equipments. Regarding the touch panel, data is inputted by directly touching a display panel. The touch panel data input is performed in a simply way and has less malfunction.

In the mean time, with the recent development and popularization of a graphic user interface (GUI) system, a touch screen is now being generally used which allows a user to simply input. The touch screen is implemented by recognizing the location of a touch occurrence on a touch sensor panel and then by performing an action corresponding to the location.

The touch sensor panel may be formed in the form of a matrix comprised of row wirings and column wirings. A sensor or pixel is located at a point where the row wirings and column wirings cross each other. Each row wiring can be driven by a sensing signal. Because electric charges injected into the column wiring by the sensing signal is proportional to the amount of touching, the location of the touch can be recognized.

In general, after a driving signal having a specific frequency is inputted to the row wirings respectively, a signal of the specific frequency is sensed through each column wiring, so that the presence and location of the touch are recognized. However, if noise exists in the specific frequency band due to a variety of reasons, precision of the touch sensing is reduced. Therefore, the frequency of the driving signal, that is, the frequency used to sense the touch is required to be changed.

SUMMARY

One embodiment is a method for minimizing noise on a touch panel including a plurality of drive lines and a plurality of sensing lines. The drive lines and the sensing lines cross each other. The method includes: performing a dummy scan to sense a signal from the sensing line in a state where a driving signal is not applied to the drive line; and comparing a threshold with a magnitude of a signal obtained through the dummy scan, and estimating noise in a first frequency band, i.e., a frequency of the driving signal.

Another embodiment is a method for minimizing noise on a touch panel including a plurality of drive lines and a plurality of sensing lines. The drive lines and the sensing lines cross each other. The method includes: performing a first dummy scan which performs, at least one time, a dummy scan in which a signal from the sensing line is sensed in a state where a driving signal is not applied to the drive line; performing a second dummy scan which performs the dummy scan at least one time when a magnitude of a signal obtained through the first dummy scan is greater than a first threshold; and comparing a second threshold with a magnitude of a signal obtained through the second dummy scan, and estimating noise in a first frequency band, i.e., a frequency of the driving signal.

Further another embodiment is a touch sensing apparatus which minimizes noise and includes a touch panel including a plurality of drive lines and a plurality of sensing lines. The drive lines and the sensing lines cross each other. The touch sensing apparatus includes: a signal sensor which performs a dummy scan to sense a signal from the sensing line in a state where a driving signal is not applied to the drive line; and a frequency hopper which compares a threshold with a magnitude of a signal obtained through the dummy scan, and estimates noise in a first frequency band, i.e., a frequency of the driving signal.

BRIEF DESCRIPTION OF THE DRAWINGS

Arrangements and embodiments may be described in detail with reference to the following drawings in which like reference numerals refer to like elements and wherein.

DETAILED DESCRIPTION

A thickness or a size of each layer may be magnified, omitted or schematically shown for the purpose of convenience and clearness of description. The size of each component may not necessarily mean its actual size.

It should be understood that when an element is referred to as being 'on' or "under" another element, it may be directly on/under the element, and/or one or more intervening elements may also be present. When an element is referred to as being 'on' or 'under', 'under the element' as well as 'on the element' may be included based on the element.

An embodiment may be described in detail with reference to the accompanying drawings.

Figure 1:
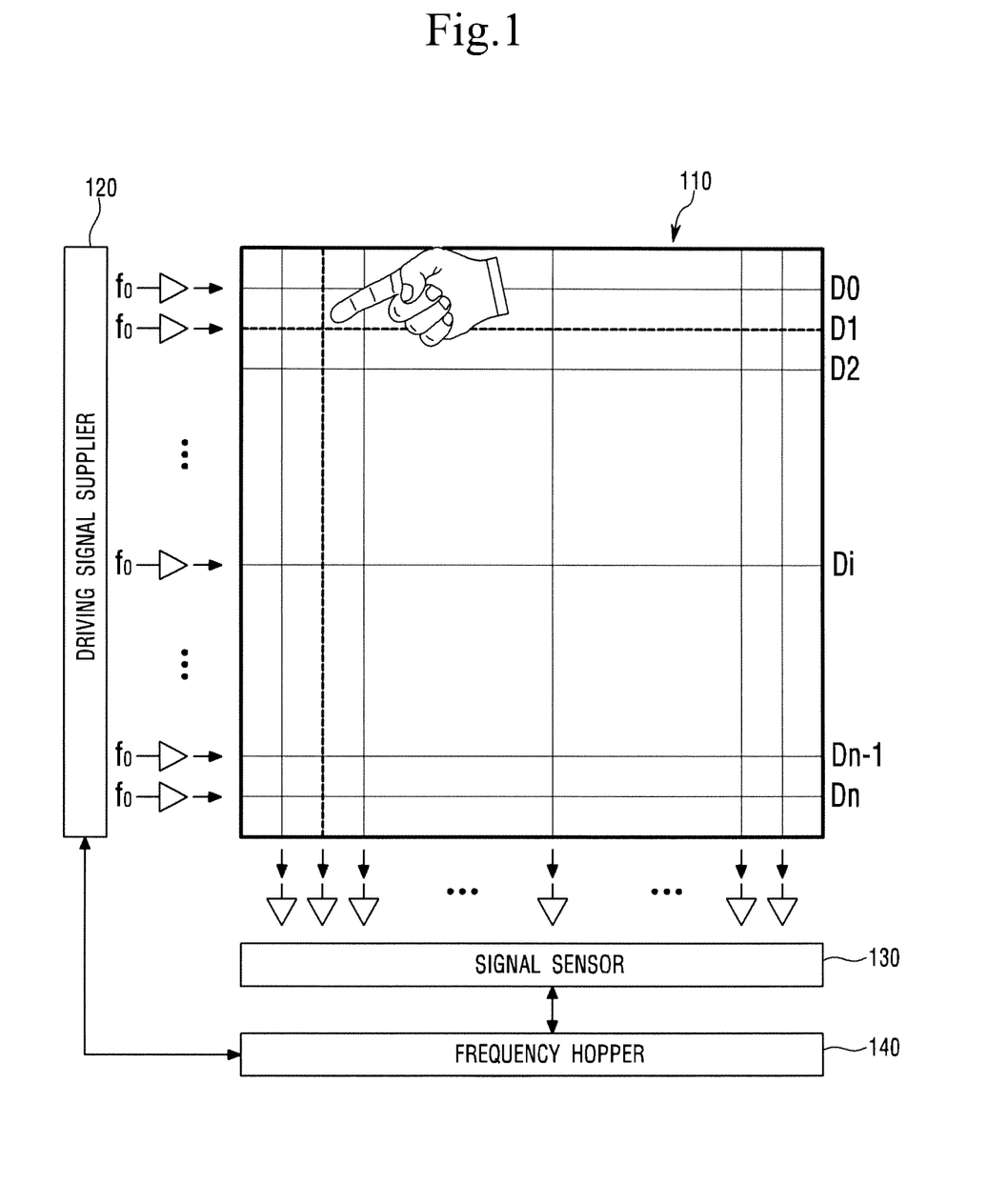
FIG. 1 is a view for describing a configuration of a touch sensing apparatus according to an embodiment of the present invention.

FIG. 1 is a view for describing a schematic configuration of a touch sensing apparatus according to an embodiment of the present invention.

Referring to FIG. 1, the touch sensing apparatus of the present invention includes a touch sensor panel 110 comprised of a plurality of row wirings and a plurality of column wirings, a driving signal supplier 120 which inputs a driving signal to the touch sensor panel 110, a signal sensor 130 which senses a signal outputted from the column wiring, and a frequency hopper 140. The driving signal supplier 120, the signal sensor 130 and the frequency hopper 140 may be modules which are controlled by a predetermined signal. These parts include routines, subroutines, programs, objects, components, data structures and the like, all of which perform specific operations to be described below or specific algorithms. However, these parts are not limited to this. Hereafter, although the driving signal supplier 120, the signal sensor 130 and the frequency hopper 140 will be described as separate parts, this is only for convenience of description. At least two of them may be formed in the form of one module. For example, the signal sensor 130 and the frequency hopper 140 may be formed in the form of one part capable of performing their respective functions.

The touch sensor panel 110 is formed in the form of a matrix comprised of row wirings and column wirings. The row wiring and the column wiring are separated from each other by a dielectric material. A sensor or pixel is located at a point where the row wirings and column wirings cross each other. Each row wiring can be driven by a stimulation signal. Therefore, it can be said that the row wiring is a drive line. Also, a sensing signal outputted from the column wiring corresponding to a point where the touch has occurred by the driving signal injected into the row wiring becomes different from a signal outputted from another column wiring, so that the location of the touch can be recognized by the signal. Therefore, it can be said that the column wiring is a sensing line.

In the following description and accompanying drawings, while a touch sensing panel having an orthogonal array consisting of the row and column will be described as an example, the embodiment of the present invention is not limited to this. The embodiment of the present invention can be applied to another touch sensing panel having an array of arbitrary dimension, for example, a diagonal array, a concentric array, a 3-dimensional random array, etc., and an array obtained by the application of them.

The drive line and the sensing line may be formed of a transparent conductive material (e.g., Indium Tin Oxide (ITO), Antimony Tin Oxide (ATO) or the like). However, the drive line and the sensing line may be also formed of another transparent material or an opaque conductive material including copper and the like.

A signal with a specific frequency may be inputted through each drive line. The signal may be generated by a driving signal supplier 120. The driving signal supplier 120 may input serially the sensing signal to each drive line. For example, on the basis of a clock signal, etc., the driving signal supplier 120 inputs the driving signal to a first drive line D0 during a first interval and inputs the driving signal to a second drive line D1 during a second interval, so that the same driving signal is controlled not to be parallelly inputted to the two or more sensing lines. This is because, when the same driving signal is parallelly inputted to a plurality of the sensing lines, it is impossible to recognize which location of the drive line the touch has occurred on, even though the touch is sensed through a particular sensing line. Therefore, the driving signals must be supplied to the drive lines at mutually different points of time.

When the touch occurs on a particular location of the touch screen, a sensing line passing through the particular location outputs a signal different from signals outputted from other sensing lines. The signal sensor 130 receives the signal outputted from each sensing line and determines which location of the sensing line the touch has occurred on. The signal sensor 130 is able to sense a signal having a frequency the same as that of the driving signal supplied by the driving signal supplier 120.

For example, the signal outputted from the sensing line passing through a point where the touch has occurred may have an amplitude lower than that of a steady-state signal outputted from another sensing line. The point where the touch has occurred can be recognized by determining the amplitude difference. The signal outputted from each sensing line may be observed parallelly or serially.

Meanwhile, even though the touch does not occur on the touch sensor panel 110, the magnitude of the signal received by the signal sensor 130 may be changed due to the noise. When there exists noise having the same frequency as that of a current sensing signal, the characteristics of the signal sensed by the signal sensor 130 may be changed.

The frequency hopper 140 according to the embodiment of the present invention estimate the noise at a current driving signal frequency, finds a frequency having a minimized noise, and thus allows the frequency of the driving signal to be changed into the frequency having a minimized noise.

Hereafter, a method for minimizing the noise will be described.

Figure 2:
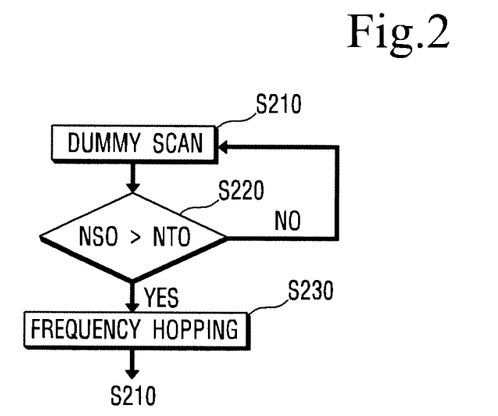
FIGS. 2 to 3 are views for describing a method for minimizing noise in a touch panel according to a first embodiment of the present invention.

FIG. 2 is a view for describing a method for minimizing noise in a touch panel according to a first embodiment of the present invention.

Referring to FIGS. 1 and 2, first, a dummy scan is performed by the signal sensor 130 (S210). The dummy scan of the present specification means a process of sensing the signal from the respective sensing lines in a state where the driving signal is not inputted to the drive line. That is, through the dummy scan, the signal from the sensing line may be sensed only one time or at least twice in a state where the driving signal is not applied. For the purpose of sensing the touch, a driving signal having a specific frequency is inputted to the drive line, and then a signal outputted from the sensing line is sensed. Here, when the signal outputted from the sensing line is sensed in a state where the driving signal is not inputted to the drive line, it is possible to recognize the presence of the current noise. The dummy scan may be performed periodically or non-periodically. For example, at every point of time when one cycle ends, during which the touch is sensed by serially inputting the driving signal to the drive lines D0 to Dn respectively, the dummy scan can be performed at least one time in a state where the driving signal is not inputted to all of the drive lines D0 to Dn.

The frequency hopper 140 according to the embodiment of the present invention compares a threshold NT0 with a magnitude NS0 of the signal sensed by the signal sensor 130 through the dummy scan (S220). The magnitude NS0 of the signal sensed by the signal sensor 130 may be the average value, the maximum value or the sum of the signals outputted from the sensing lines respectively. However, any variable will be used so long as it can discover even the characteristics of the signal outputted from the sensing line at the presence of the noise. If the magnitude NS0 of the signal sensed by the signal sensor 130 through the dummy scan is less than the threshold NT0, this means that the noise is acceptable in a band of the current driving signal frequency (or the frequency of the signal sensed by the signal sensor 130). Therefore, the driving signal having the frequency same as the current driving signal frequency can be continuously used. Here, a single dummy scan can be continuously performed (for example, at every point of time when one cycle ends, during which the touch is sensed by serially inputting the driving signal to all of the drive lines D0 to Dn).

Meanwhile, if the magnitude NS0 of the signal sensed by the signal sensor 130 through the dummy scan is greater than the threshold NT0, this means that the noise having the same frequency as that of the current driving signal is not acceptable. Therefore, the frequency hopper 140 changes the frequency of the signal sensed by the signal sensor 130 (S230). This is referred to as "frequency hopping". After the frequency hopping is performed, the single dummy scan may be repetitively performed in the corresponding frequency (S210).

Figure 3:
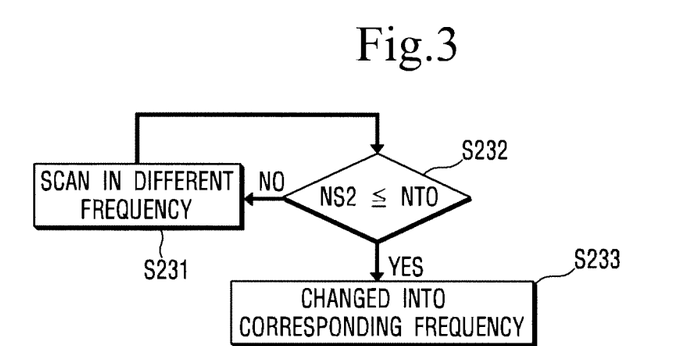

Referring to FIG. 3, the frequency hopping S230 may be performed by the following process. First, the dummy scan is performed in a frequency band different from that of the current driving signal (S231). In other words, when the signal sensor 130 senses a signal corresponding to a first frequency band, the first frequency band is changed into a second frequency band, and then the dummy scan is performed. A magnitude NS0' of the sensed signal through the dummy scan is compared with the threshold NT0 (S232). If the magnitude NS0' of the sensed signal through the dummy scan is less than the threshold NT0, the frequency of the driving signal is changed into the corresponding frequency (S233). However, through the dummy scan in the second frequency band, if the magnitude NS0' of the signal sensed by performing the dummy scan is greater than the threshold NT0, the frequency band of the signal is changed into a third frequency band, and then the dummy scan is performed again (S231).

The frequency hopping S230 can be performed in various manners other than the embodiment shown in FIG. 3. For instance, the magnitude NS0' of the signal through the dummy scan performed in the frequency changed in step S232 may be compared with the magnitude NS0 of the signal through the dummy scan performed in the frequency before being changed. Additionally, the dummy scan is performed in all the various frequency candidates, and then a frequency having a smallest magnitude may be selected and changed.

When the frequency hopping S230 is completed, the corresponding process may be repeated from step S210.

Figure 4:
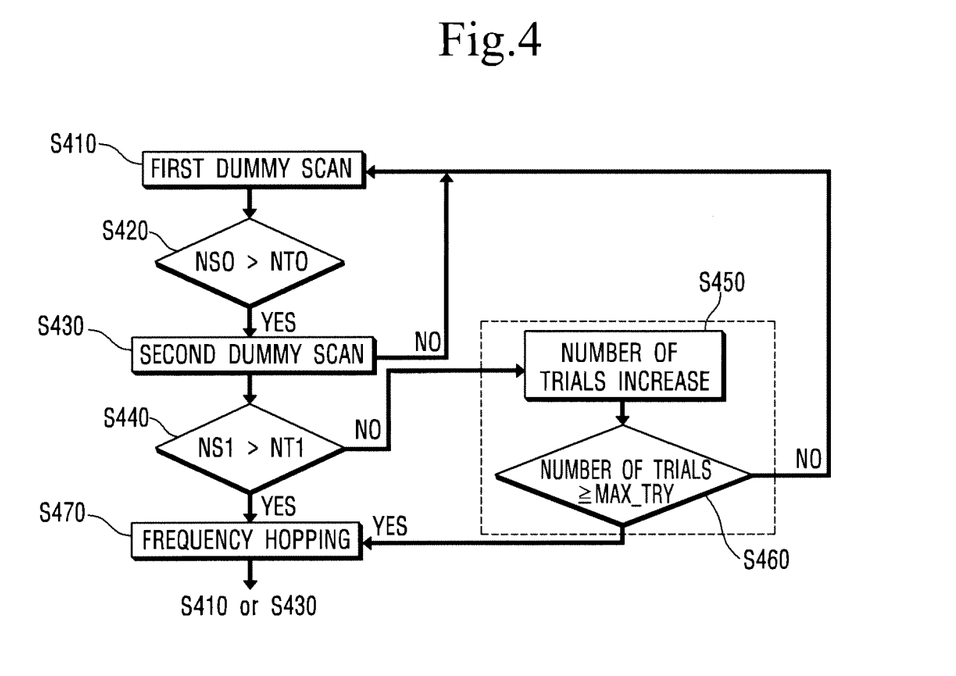
FIGS. 4 to 6 are views for describing a method for minimizing noise in a touch panel according to a second embodiment of the present invention.

FIG. 4 is a view for describing a method for minimizing noise in a touch panel according to a second embodiment of the present invention.

Referring to FIGS. 1 and 4, first, a first dummy scan is performed by the signal sensor 130 (S410). As described above, the dummy scan means a process of sensing the signal from the respective sensing lines in a state where the driving signal is not inputted to the drive line. The first dummy scan in step S410 means that the dummy scan is performed at least one time. After the first dummy scan is performed, the magnitude NS0 of the sensed signal is compared with the threshold NT0 (S420). As described above, the magnitude NS0 of the sensed signal may be the average value, the maximum value or the sum of the signals outputted from the sensing lines respectively.

If the magnitude NS0 of the signal sensed by the signal sensor 130 through the first dummy scan is less than the threshold NT0, this means that the noise is acceptable in a band of the current driving signal frequency (or the frequency of the signal sensed by the signal sensor 130). Therefore, the driving signal having the frequency same as the current driving signal frequency can be continuously used. Here, the first dummy scan can be continuously performed (for example, at every point of time when one cycle ends, during which the touch is sensed by serially inputting the driving signal to all of the drive lines D0 to Dn).

Meanwhile, if the magnitude NS0 of the signal sensed by the signal sensor 130 through the dummy scan is greater than the first threshold NT0, this may mean that the noise having the same frequency as that of the current driving signal is not acceptable.

Here, the frequency hopper 140 performs a second dummy scan (S430). The second dummy scan may mean that the dummy scan is performed again at least one time. That is, the signal from the sensing line is sensed at least one time in a state where the driving signal is not applied to the drive line. The number of repetition times of the signal sensing may be equal to or not equal to the number of repetition times of the dummy scan in step S410. For example, the number of repetition times of the dummy scan in the second dummy scan step S430 may be greater than the number of repetition times of the dummy scan in the first dummy scan step S410.

A magnitude NS1 of a signal obtained through the second dummy scan is compared with a second threshold NT1 (S440). Here, the threshold NT1 may be different from the threshold NT0 used in step S420. For instance, when the number of repetition times of the dummy scan in the first dummy scan step S410 is equal to the number of repetition times of the dummy scan in the second dummy scan step S420, the threshold NT1 used in step S440 may be greater than the threshold NT0 used in step S420.

The magnitude NS1 of the signal obtained through the second dummy scan may be at least one of the average value, the maximum value or the sum of the magnitudes of the signals obtained through the respective dummy scans. However, the magnitude NS1 is not limited to this. If, as a result of the comparison in step S440, the magnitude NS1 of the signal obtained through the second dummy scan is less than the second threshold NT1, the single dummy scan S410 is performed again at the same frequency. Here, since the steps S410 to S440 may be repeated unlimitedly, the number of repetition times of the steps needs to be limited. For this, step S450 and step S460 may be performed. Every time step S410 is performed after step S440, "the number of trials" is increased by 1 (S450). When "the number of trials" is equal to a predetermined repetition threshold value MAX_TRY, step S410 is not performed and a frequency hopping step S470 may be performed. However, the steps S450 and S460 can be omitted.

As a result of the comparison in step S440, either when the magnitude NS1 of the signal obtained through the second dummy scan is greater than the second threshold NT1 or when the number of repetition times of the steps S410 to S440 is greater than a predetermined number, the frequency hopping is performed (S470). As described above, the frequency hopping means that the frequency of the signal sensed by the signal sensor 130 is changed.

Figure 5:
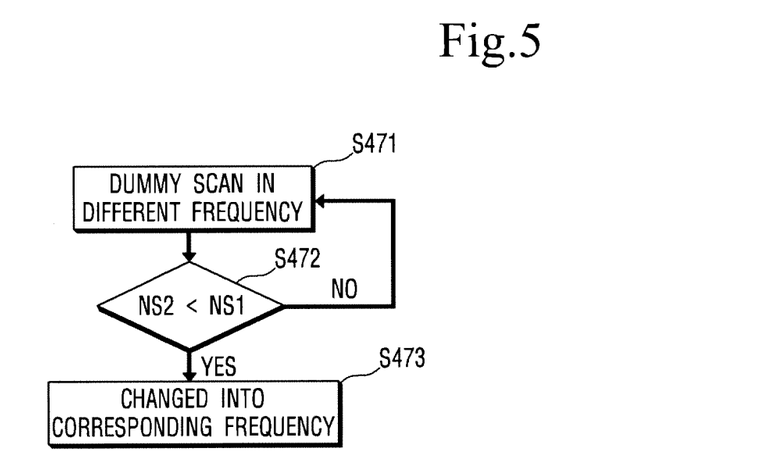

Referring to FIG. 5, the frequency hopping S470 may be performed according to the following process. First, the dummy scan is performed in a frequency band different from the frequency band of the current driving signal (S471). In other words, when the signal sensor 130 senses a signal corresponding to the first frequency band, the first frequency is changed into the second frequency band, and then the dummy scan is performed at least one time. A magnitude NS2 of the signal obtained by performing the dummy scan in the second frequency band is compared with the magnitude NS1 of the signal obtained by performing the dummy scan in the first frequency band (S472). While FIG. 5 shows that the magnitude NS1 of the signal obtained by performing the dummy scan in the first frequency band corresponds to the magnitude NS1 of the signal obtained through the second dummy scan in step S430 (see FIG. 4), the magnitude NS1 of the signal obtained by performing the dummy scan in the first frequency band may be replaced by the magnitude NS0 of the signal obtained through the first dummy scan in step S410.

If, as a result of the comparison in step S472, the magnitude NS2 of the signal obtained by performing the dummy scan in the second frequency band is less than the magnitude NS1 of the signal obtained by performing the dummy scan in the first frequency band, the frequency of the driving signal is changed into the corresponding frequency (S473). However, if not, the frequency of the driving signal is changed into the third frequency, and then the dummy scan is performed again (S471).

Figure 6:
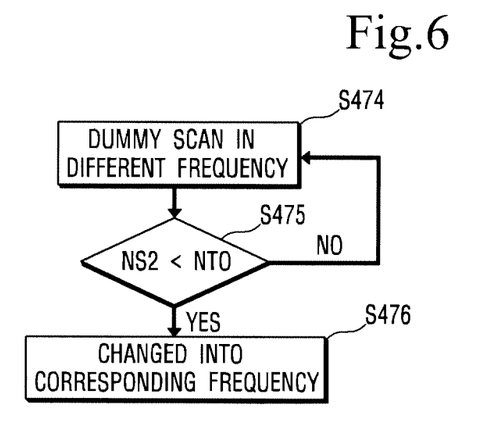

Meanwhile, referring to FIG. 6, the frequency hopping S470 may be performed according to the following process. First, the dummy scan is performed in a frequency band different from the frequency band of the current driving signal (S474). In other words, when the signal sensor 130 senses a signal corresponding to the first frequency band, the first frequency is changed into the second frequency band, and then the dummy scan is performed at least one time. The magnitude NS2 of the signal obtained by performing the single dummy scan in the second frequency band is compared with the threshold NT0 (S475). Now, while this threshold NT0 may be equal to the threshold NT0 which is a target to be compared with the magnitude NS0 of the signal obtained through the first dummy scan in step S420 (see FIG. 4), this threshold NT0 may be equal to the threshold NT1 which is a target to be compared with the magnitude NS1 of the signal obtained through the second dummy scan in step S440 or may be another third threshold. As a result of the comparison in step S472, the magnitude NS2 of the signal obtained by performing the dummy scan in the second frequency band is less than the threshold NT0, the frequency of the driving signal is changed into the corresponding frequency (S476). However, if not, the frequency of the driving signal is changed into the third frequency, and then the dummy scan is performed again (S474).

However, the frequency hopping S470 can be performed in various manners other than the embodiments shown in FIGS. 5 and 6. For example, a modified example of the above-described method shown in FIG. 5 will be provided. In step S472, the magnitude NS2 of the signal obtained through the dummy scan in the second frequency band may be compared with the threshold NT1 used in step S440 (see FIG. 4). Also, the dummy scan is performed in all the various frequency candidates, and then a frequency having a smallest magnitude may be selected and changed.

Referring back to FIG. 4, after the frequency hopping S470 is completed, the corresponding process may be repeated from step S410 or step 430. That is, after the frequency hopping is completed, it is possible that the first dummy scan is performed in the changed frequency band (S410) and then the noise is estimated, or the second dummy scan is performed with the omission of the first dummy scan (S430) and then the noise is estimated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for minimizing noise on a touch panel including a plurality of drive lines and a plurality of sensing lines, wherein the drive lines and the sensing lines cross each other, the method comprising:
    performing a first dummy scan at least one time, in which a signal from the sensing lines is sensed in a state where a driving signal is not applied to the drive lines;
    performing a second dummy scan at least one time when a magnitude of a signal obtained through the first dummy scan is greater than a first threshold;
    comparing a second threshold with a magnitude of a signal obtained through the second dummy scan, and estimating noise in a first frequency band;
    when the magnitude of the signal obtained through the second dummy scan is less than or equal to the second threshold, performing the first dummy scan again; and
    when the magnitude of the signal obtained through the second dummy scan is less than or equal to the second threshold and a number of repetition times of the first dummy scan is greater than or equal to a threshold number, performing frequency hopping which changes a frequency of a driving signal.

2. The method of claim 1, further comprising:
    performing frequency hopping which changes the frequency of the driving signal when the magnitude of the signal obtained through the second dummy scan is greater than the second threshold.

3. The method of claim 2, wherein the performing of frequency hopping comprises:
    performing another dummy scan at least one time in a second frequency band different from the first frequency band;
    determining whether a magnitude of a signal obtained through the another dummy scan in the second frequency band is less than the magnitude of the signal obtained through the first or the second dummy scan in the first frequency band; and
    changing the frequency of the driving signal into the second frequency when it is determined that the magnitude of a signal obtained through the another dummy scan in the second frequency band is less than the magnitude of the signal obtained through the first or the second dummy scan in the first frequency band.

4. The method of claim 2, wherein the performing of frequency hopping comprises:
    performing another dummy scan in a second frequency band different from the first frequency band;
    determining whether a magnitude of the signal obtained through the another dummy scan in the second frequency band is less than or equal to the first or the second threshold; and
    changing the frequency of the driving signal into the second frequency when it is determined that the magnitude of the signal obtained through the another dummy scan in the second frequency band is less than or equal to the first or the second threshold.

5. The method of claim 4, wherein the performing of frequency hopping further comprises performing a further dummy scan at least one time in a third frequency band different from the first and the second frequency bands when the magnitude of the signal obtained through the another dummy scan in the second frequency band is greater than the first or the second threshold.

6. The method of claim 2, wherein the performing of frequency hopping comprises performing another dummy scan in at least one frequency candidate, and changing the frequency of the driving signal into a frequency having a smallest magnitude.

* * * * *